United States Patent [19]

Larson et al.

[11] Patent Number: 5,679,739
[45] Date of Patent: Oct. 21, 1997

[54] ORGANOSILOXANE COMPOSITIONS EXHIBITING INCREASED PENETRATION INTO POROUS SUBSTRATES

[75] Inventors: Kent Robert Larson; Gerald Lawrence Witucki, both of Midland, Mich.

[73] Assignee: Dow Corning Corporation, Midland, Mich.

[21] Appl. No.: 419,477

[22] Filed: Apr. 10, 1995

[51] Int. Cl.$^6$ ........................ C08K 5/24
[52] U.S. Cl. ............ 524/731; 524/862; 524/863; 528/15
[58] Field of Search ............... 524/731, 862, 524/863; 528/15

[56] References Cited

U.S. PATENT DOCUMENTS

| | | | |
|---|---|---|---|
| 3,419,593 | 12/1968 | Willing | 260/448.2 |
| 3,445,420 | 5/1969 | Kookootsedes et al. | 260/37 |
| 3,989,667 | 11/1976 | Lee et al. | 260/46.5 UA |
| 4,839,452 | 6/1989 | Kurita et al. | 528/15 |
| 5,036,117 | 7/1991 | Chung et al. | 522/172 |
| 5,108,791 | 4/1992 | Chung et al. | 427/208.8 |
| 5,125,998 | 6/1992 | Jones et al. | 156/273.3 |

*Primary Examiner*—Karen A. Dean
*Attorney, Agent, or Firm*—Paula J. Lagattuta

[57] ABSTRACT

Oligomers wherein phenylalkylsiloxane units comprise at least a portion of the repeating units increase the ability to penetrate porous substrates that is exhibited by crosslinkable liquid organosiloxane compositions containing polyorganosiloxanes when the oligomer exhibits limited compatibility with the crosslinkable polyorganosiloxane(s) present in the curable organosiloxane composition.

9 Claims, No Drawings

ORGANOSILOXANE COMPOSITIONS EXHIBITING INCREASED PENETRATION INTO POROUS SUBSTRATES

BACKGROUND OF THE INVENTION

1. Field of the Invention

This invention relates to crosslinkable organosiloxane compositions. More particularly this invention relates to additives for liquid organosiloxane compositions containing polyalkylsiloxanes as the crosslinkable polymer. The additives increase the ability of these compositions to deeply penetrate into small diameter pores of porous substrates such as wood.

2. Background Information

The prior art describes liquid organosiloxane compositions that can be crosslinked to yield elastomers and other useful products. Methods for curing compositions of this type include but are not limited to 1) hydrolysis of potentially reactive groups on the crosslinking agent and reaction of these groups with silanol groups on a crosslinkable polyorganosiloxane, and 2) a hydrosilation reaction involving ethylenically unsaturated groups and silicon-bonded hydrogen atoms in the presence of a platinum group metal or compound thereof as a catalyst, 3) the reaction of silanol groups on a crosslinkable polyorganosiloxane with an organohydrogensiloxane, and 4) free radical reactions initiated by decomposition of a photolytically unstable free radical source.

For certain applications such as mold making using masters formed from porous materials such as wood, it is desirable to reproduce with great accuracy the porous structure of the master. Even the lowest viscosity organosiloxane compositions that will yield the minimum levels of tear strength and toughness required for this application do not penetrate more than 1 or 2 millimeters into pores measuring less than about 1 mm in diameter.

SUMMARY OF THE INVENTION

The present invention is based on the discovery that a small amount of certain organosiloxane oligomers wherein phenylalkylsiloxane units comprise at least a portion of the repeating units increases the ability of a curable organosiloxane composition to penetrate porous substrates when the oligomer is immiscible with the crosslinkable polyorganosiloxane(s) present in the curable organosiloxane composition.

DETAILED DESCRIPTION OF THE INVENTION

This invention provides an organosiloxane composition comprising

A) a liquid crosslinkable polyorganosiloxane containing at least two reactive groups per molecule;

B) as the crosslinking agent for said composition, an organosilicon compound containing at least three groups per molecule that react with the reactive groups of said polyorganosiloxane to form a crosslinked product, wherein the concentration of said crosslinking agent is sufficient to obtain said crosslinked product;

C) an amount of said catalyst sufficient to promote crosslinking of said composition; and D) a liquid organosiloxane oligomer containing an average of at least one phenylalkylsiloxane or (phenylalkyl)-alkylsiloxane unit per molecule, wherein the alkyl radical and the alkyl portion of the phenylalkyl radical contain from 1 to 4 carbon atoms, the concentration of said oligomer is sufficient to increase the penetration of said composition when applied on a porous substrate, and said oligomer exhibits limited compatability with said polyorganosiloxane.

The Penetrability Enhancer (Ingredient D)

The purpose of this additive is to increase the extent to which the present compositions will permeate or penetrate into pores on the surface of a porous substrate. Porous substrates include but are not limited to naturally occurring materials such as wood and stone, and organic polymers that are either porous in their naturally occurring state or can be fabricated with porous surfaces that contain pores measuring from 0.1 to about 1 mm in diameter.

Ingredient D is an organosiloxane oligomer that is a liquid at the use temperature of the present compositions, contains at least one phenylalkylsiloxane or (phenylalkyl)-alkylsiloxane unit per molecule, and has limited compatibility with the liquid polyorganosiloxane referred to as ingredient A. While ingredients A and D appear to be miscible, analysis of the mixture would reveal a higher concentration of ingredient D at the surface(s) relative to the interior portion.

The phenyl-containing siloxane units can by represented by the formula $R_1(PhC_pH_{2p})SiO$, wherein Ph represents phenyl and $R^1$ represents an alkyl radical containing from 1 to about 10 carbon atoms, and p is 0 or an integer from 1 to 4. $R^1$ preferably contains from 1 to 3 carbon atoms, and is most preferably methyl. Examples of suitable phenyl-containing diorganosiloxane units wherein $R^1$ is methyl include but are not limited to methylphenylsiloxane units, methyl-beta-phenylethyl-siloxane units and methyl-2-methyl-2-phenylethylsiloxane units.

The phenyl-containing siloxane units together with any additional siloxane units present in ingredient D can be arranged in a cyclic or linear configuration. When in a linear configuration, the two terminal triorganosiloxane units present in each molecule contain three monovalent hydrocarbon radicals bonded to the silicon atom. These hydrocarbon radicals can be all alkyl, such as methyl, or a combination of two alkyl and one phenyl radical.

Examples of organosiloxane oligomers suitable for use as ingredient D include but are not limited to cyclic and linear oligomers; mixtures of these oligomers with other liquid oligomeric diorganosiloxanes; and cyclic and linear oligomers containing at least one of the present phenyl-containing siloxane units and at least one additional type of diorganosiloxane unit.

To increase the extent to which a composition containing ingredient D will penetrate into the pores of a porous substrate, this ingredient should contain no more than an average of about 30 repeating units, preferably no more than about 10 repeating units per molecule, at least 20 percent of which are phenyl-containing siloxane units.

The oligomer(s) used as ingredient D should have the lowest possible molecular weight and highest phenyl content commensurate with the cost and availability of this ingredient.

If cost and availability were not considerations, cyclic methylphenylsiloxanes would be the preferred diluents, followed by trimethylsiloxy-terminated polymethylphenylsiloxanes and mixtures of cyclic methylphenylsiloxanes and dimethylsiloxanes.

The Crosslinkable Polyorganosiloxane (Ingredient A)

Organosiloxane compositions suitable for use with the present penetration-enhancing additives cure to form crosslinked materials by the reaction of a liquid polyorganosiloxane containing at least two reactive groups, referred to in this specification as ingredient A, with a crosslinking agent that is typically an organosilicon compound containing at least three silicon-bonded groups that in the presence of a suitable catalyst will react with the groups present on ingredient A to form a crosslinked material.

The reactive groups that can be present in ingredient A are typically silanol, a hydrolyzable group that forms a silanol group in the presence of moisture, or an ethylenically unsaturated group such as alkenyl or (meth) acryloxy. (Meth)acryloxy groups are typically bonded to a silicon atom of ingredient A through an alkylene radical. Preferred polyorganosiloxanes are liquids at 25° C.

When the reaction used to crosslink ingredient A involves free radicals, the reactive groups in ingredient A can be saturated or ethylenically unsaturated hydrocarbon radicals.

The repeating units of preferred embodiments of ingredient A can be represented by the general formula $X_q R^2_r SiO_{4-q/2}$, where X represents hydroxyl or an ethylenically unsaturated group, $R^2$ represents an unsubstituted or substituted monovalent non-aromatic hydrocarbon radical, q is 0 or 1 and r is 1 or 2. The presence of phenyl and other aromatic radicals should be avoided to ensure that ingredients A and D have only limited compatability with one another.

When r is 2 the hydrocarbon radicals represented by $R^2$ can be identical or different. Ingredient A can contain one or more different types of repeating units and the units containing X substituents are preferably located on at least the terminal positions of the molecule.

The substituent represented by X will depend upon the reaction used to crosslink the composition. For example, when the crosslinking agent contains silicon-bonded hydrogen atoms, X can be an ethylenically unsaturated group such as alkenyl or a silanol group. X is also a silanol group when ingredient A is to be crosslinked using an organosilicon compound containing at least three silicon-bonded hydrolyzable groups per molecule.

The hydrocarbon radicals represented by $R^2$ include alkyl containing from 1 to about 12 carbon atoms, alkenyl such as vinyl and allyl, and cycloalkyl such as cyclopentyl and cyclohexyl.

At least one of the hydrocarbon radicals bonded to each silicon atom of ingredient A is preferably alkyl containing from 1 to 4 carbon atoms, most preferably methyl.

To achieve a useful level of tensile strength and other physical properties in the cured material the number average molecular weight of ingredient A should be at least 20,000, preferably from 25,000 to 100,000. The viscosity of polyorganosiloxanes with number average molecular weights above about 100,000 are typically too high to achieve the desired permeation of porous substrates.

The Crosslinking Agent (Ingredient B)

The reactive groups present on the crosslinking agents used for the polyorganosiloxanes referred to as ingredient A of the present moisture curable compositions will depend upon the type of reactive group present on this ingredient A.

When the reactive groups in ingredient A are ethylenically unsaturated groups such as alkenyl radicals that are to be crosslinked by a hydrosilation reaction, the crosslinking agent, referred to hereinafter as ingredient B, is an organohydrogensiloxane.

The organohydrogensiloxane must contain at least 2 silicon-bonded hydrogen atoms in each molecule. If ingredient A contains only two alkenyl radicals per molecule, ingredient B must contain an average of more than two silicon-bonded hydrogen atoms to achieve a crosslinked structure in the final cured product.

The silicon-bonded organic groups present in the organohydrogensiloxane are selected from the same group of monovalent hydrocarbon radicals as the organic groups of ingredient A. The organic groups in the organohydrogensiloxane are preferably free of ethylenic or acetylenic unsaturation. The molecular structure of this ingredient can be straight chain, branch-containing straight chain, cyclic, or network.

While the molecular weight of the organohydrogensiloxane is not specifically restricted, viscosities in the range of 3 to 10,000 centipoise (0.003 to 10 Pa.s) at 25 degrees Centigrade are preferred.

The concentration of the organohydrogensiloxane is sufficient to provide a molar ratio of silicon-bonded hydrogen atoms to alkenyl radicals and any other ethylenically unsaturated groups in the curable composition of from 0.5 to 20. A range of from 0.5 to 2 is preferred.

When the curable composition contains less than 0.5 moles of silicon-bonded hydrogen atoms per mole of alkenyl radicals it may not be possible to achieve the desired physical properties following curing. The physical properties of the cured article may vary with time when this ratio exceeds about 20 moles of silicon-bonded hydrogen per mole of alkenyl radicals.

The preferred molar ratio of silicon-bonded hydrogen atoms to alkenyl and any other ethylenically unsaturated groups in the crosslinkable compositions of this invention that cure by a hydrosilation reaction will be determined at least in part by the desired physical properties of the crosslinked material, particularly hardness and tensile strength.

When the reactive groups in ingredient A are silanol groups, the crosslinking agent can be an organohydrogensiloxane or an organosilicon compound containing an average of at least three silicon-bonded hydrolyzable groups per molecule. Examples of suitable hydrolyzable groups include but are not limited to alkoxy containing from 1 to about 4 carbon atoms, alkenyloxy such as isopropenyloxy, carboxy such as acetoxy, ketoximo such as methylethyl ketoximo, and amido such as acetamido. Preferred hydrolyzable groups are methoxy, ethoxy, acetoxy and methylethylketoximo.

When ingredient B contains silicon-bonded hydrolyzable groups, this ingredient can be a silane, disiloxane or a polyorganosiloxane. Silanes are generally preferred, based on their cost and availability. Preferred silanes include but are not limited to methyltrimethoxysilane, phenyltrimethoxysilane, methyltriethoxysilane, methyltriacetoxysilane, methyltri(methylethylketoximo) silane, alkyl orthosilicates such as tetraethyl orthosilicate and condensation products of these orthosilicates, which are typically referred to as alkyl polysilicates.

The concentration of crosslinking agent should be sufficient to convert the composition to an elastomeric or resinous material exhibiting the desired physical properties. Typical moisture curable compositions contain from 0.5 to 6 weight percent of alkoxy or other hydrolyzable group based on the total weight of the curable composition.

Crosslinking reactions involving the reaction of silicon-bonded hydrolyzable groups typically require the presence of water, which can be present as water vapor in the atmosphere. If this amount of water is insufficient, water can be an ingredient of a composition that is packaged in at least two containers such that the water and ingredient B are located in separate containers.

If the reaction used to cure the organosiloxane composition involves free radicals, the crosslinking agent is a compound that generates free radicals in the presence of heat and/or visible or ultraviolet light.

The Crosslinking Catalyst (Ingredient C)

In addition to the crosslinkable polyorganosiloxane and crosslinking agent, compositions that crosslink using a hydrosilation reaction, the reaction between silanol groups and silicon-bonded hydrogen atoms or the reaction between silanol groups and silicon-bonded hydrolyzable groups in the presence of water typically include a catalyst to promote initiation of the crosslinking reaction.

When the reaction used to crosslink ingredient A is a hydrosilation reaction or a reaction between silanol groups and silicon-bonded hydrogen atoms, the catalyst is a metal from the platinum group of the periodic table or a compound of one of these metals. Platinum and its compounds are preferred catalysts based on their efficacy.

Examples of preferred crosslinking catalysts of this type include but are not limited to platinum black, platinum metal on various solid supports, chloroplatinic acid, alcohol solutions of chloroplatinic acid, and complexes of chloroplatinic acid with liquid ethylenically unsaturated compounds such as olefins and organosiloxanes containing ethylenically unsaturated hydrocarbon radicals bonded to silicon. Complexes of chloroplatinic acid with the aforementioned organosiloxanes containing ethylenically unsaturated hydrocarbon radicals are described in U.S. Pat. No. 3,419,593, which issued to David N. Willing on Dec. 31, 1968. The relevant portions of this patent are incorporated herein by reference as a teaching of preferred catalysts.

The concentration of platinum group metal containing catalysts is equivalent to a platinum concentration of from 0.1 to 500 parts by weight of platinum metal, preferably from 1 to 50 parts by weight of platinum metal, per million parts (ppm), based on the combined weight of ingredients A and B.

Curing does not proceed satisfactorily at below 0.1 ppm of platinum, while using more than 500 ppm results in no appreciable increase in cure rate, and is therefore uneconomical.

Mixtures of a polyorganosiloxane containing ethylenically unsaturated groups, an organohydrogensiloxane and a platinum group metal or compound thereof may begin to cure at ambient temperature. To obtain a longer working time or "pot life", the activity of the catalyst under ambient conditions can be retarded or suppressed by addition of a suitable inhibitor.

Known platinum catalyst inhibitors include the acetylenic compounds disclosed in U.S. Pat. No. 3,445,420, which issued on May 20, 1969 to Kookootsedes et al. Acetylenic alcohols such as 2-methyl-3-butyn-2-ol constitute a preferred class of inhibitors that will suppress the activity of a platinum-containing catalyst at 25° C. Compositions containing these catalyst inhibitors typically require heating at temperatures of 70° C. or above to cure at a practical rate.

When it is desired to increase the pot life under ambient conditions of a composition that cures by a hydrosilation reaction, this can be accomplished using an alkenyl substituted siloxane of the type described in U.S. Pat. No. 3,989,667, which issued on Nov. 2, 1976 to Lee and Marko. Cyclic methylvinylsiloxanes are preferred.

Inhibitor concentrations as low as one mole of inhibitor per mole of platinum will in some instances impart satisfactory storage stability and cure rate. In other instances inhibitor concentrations of up to 500 or more moles of inhibitor per mole of platinum are required. The optimum concentration for a given inhibitor in a given composition can readily be determined by routine experimentation and does not constitute part of this invention.

When the reaction used to crosslink ingredient A involves silanol groups on ingredient A and hydrolyzable groups present on ingredient B, the catalyst is typically a compound of tin or titanium. Useful tin compound include but are not limited to divalent tin salts of carboxylic acids such as stannous acetate and stannous octoate and organotin compounds such as dimethyltin dineodecanoate, dibutyltin diacetate, dibutyltin dilaurate and dioctyltin diacetate. The carboxylic acid portion of these tin compounds contain from 1 to 20 carbon atoms.

Preferred titanium compounds include but are not limited to esters of the general formula $Ti(OR)_4$, where R represents an alkyl radical containing from 1 to about 8 carbon atoms and chelated compound obtained by the reaction of these esters with chelating agents such as beta-diketones and bet-ketoesters such as esters of acetoacetic acid.

The concentration of curing catalyst appears critical to achieving a practical cure rate following the inhibition period resulting from the presence of the working time extender. In preferred curable compositions of the present invention the concentration of catalyst is from 0.5 to about 5 weight percent, based on the weight of the curable polyorganosiloxane (ingredient A).

Crosslinking reactions involving photolytically or thermally generated free radicals typically do not require a catalyst.

Optional Ingredients

In addition to ingredients referred to as A, B, C, and D, the present compositions can contain additional ingredients to modify the properties of the curable composition or cured materials prepared using this composition. These additional ingredients include but are not limited to liquid diluents, reinforcing fillers such as finely divided silica of the fume or precipitated type, non-reinforcing fillers such as quartz and calcium carbonate, water to accelerate crosslinking of moisture curable compositions, surfactants, stabilizers to inhibit degradation in the presence of heat and/or ultraviolet light, anti-oxidants, dyes, pigments and flame retardants. Non-reactive polyorganosiloxanes are a preferred class of diluents.

In place of inorganic reinforcing agents such as finely divided silica, one can use organosiloxane copolymers comprising repeating units of the formulae $R^3_3SiO_{1/2}$ and $SiO_{4/2}$. These copolymers can optionally contain units of the formula $R^3_2SiO$. In these formulae the substituents represented by $R^3$ are alkyl radicals containing from 1 to about 4 carbon atoms, and the molar ratio of $R^3_3SiO_{1/2}$ to $SiO_{4/2}$ is from 0.5 to about 1.5, preferably greater than 1, preferably from 0.6 to 0.9. When the composition cures by a hydrosilation reaction the copolymer contains up to about 5 weight percent of vinyl or other ethylenically unsaturated hydrocarbon radical as a portion of the hydrocarbon radicals represented by $R^3$ in the preceding formula.

The concentration of the organosiloxane copolymer will depend upon the degree of reinforcement desired in the final crosslinked product, and can range from 1 up to about 20 parts by weight per 100 parts of ingredient A.

Preparation and Curing of Crosslinkable Compositions

The compositions of this invention are prepared by blending all of the ingredients together. For those compositions requiring moisture to initiate the curing reaction, curing begins when these compositions are exposed to moisture, and requires from several minutes to several hours, depending upon the relative humidity in the curing environment, the temperature, and the type and concentration of curing catalyst and working time extender.

When it is desired to prepare embodiments of the present compositions that crosslink in the presence of moisture for more than one or two days prior to curing them, the compositions are preferably stored in two containers, one of which contains ingredients A and any water. The curing agent and curing catalyst are packaged in a separate container. The permeability additive together with any fillers and other optional ingredients can be packaged in either or both containers, so long as these are substantially free of water.

The elastomers prepared using the present compositions are suitable for use in a variety of end use applications, including sealants, coating materials and as portants or encapsulants for electrical and electronic devices where penetration into pores or small crevices present on the substrate is desirable.

The compositions are particularly useful for preparing molds by applying the composition to a porous master when it is desirable to accurately replicate the porous structure of the master.

EXAMPLES

The following examples describe preferred curable compositions of the present invention, and should not be interpreted as limiting the invention defined in the accompanying claims. Unless otherwise indicated all parts and percentages in the examples are by weight and viscosities are the values measured at 25° C.

Example 1

This example demonstrates the increase in pore penetration imparted by the present additives to an organosiloxane composition that cures by a platinum-catalyzed hydrosilation reaction.

A curable composition was prepared by blending the following ingredients to homogeneity:

102 parts of a liquid dimethylvinylsiloxy terminated polydimethylsiloxane exhibiting a viscosity of about 55 Pa.s at 25° C.;

22 parts of a benzene soluble resinous copolymer containing triorganosiloxy units and $SiO_2$ units in the molar ratio of about 0.7 mol of triorganosiloxy units per mol of $SiO_2$ units, where the triorganosiloxy units are trimethylsiloxy and dimethylvinylsiloxy, and the copolymer contains about 1.8 weight percent of vinyl radicals;

37 parts of quartz with an average particle size of 5 microns;

0.3 parts of a reaction product of hexachloroplatinic acid and sym-tetramethyldivinyldisiloxane that has been diluted with a liquid dimethylvinylsiloxy terminated polydimethylsiloxane in an amount sufficient to achieve a platinum content of 0.7 weight percent;

32 parts of a trimethylsiloxy-terminated polydiorganosiloxane containing an average of five methylhydrogensiloxane units and three dimethylsiloxane units per molecule with a silicon-bonded hydrogen atom content of about 0.7;

7 parts of a blue-green pigment, and 2 parts of cyclic methylvinylsiloxanes.

The resultant curable composition was blended with 0.5 weight percent, based on the weight of the curable composition, of three different phenyl-containing organosiloxane oligomers that are within the scope of the present invention.

D1—a trimethylsiloxy-terminated diorganosiloxane copolymer wherein about 40 percent of the non-terminal units were methyl-alpha-methylstyrylsiloxy, about 60 percent were methylethylsiloxy and the viscosity of the copolymer was 1200 centistokes ($1.2 \times 10^{-3}$ m$^2$/sec).

D2—a mixture of cyclic diorganosiloxane oligomers consisting essentially of a 1:1 mole ratio mixture of dimethylsiloxane and phenylmethylsiloxane units.

D3—a trimethylsiloxy-terminated dimethylsiloxane/methylphenylsiloxane copolymer wherein the molar ratio of dimethylsiloxane to phenylmethylsiloxane units was 1:2 and the viscosity was 125 centistokes ($1.25 \times 10^{-4}$ m$^2$/sec.).

For comparative purposes one portion of the curable composition was also blended with 0.5 weight percent, based on the weight of the curable composition, of phenyltrimethoxysilane (D4) and a second portion was blended with the same quantity of a trimethylsiloxy-terminated dimethylsiloxane/phenylmethylsiloxane copolymer (D5) wherein the molar ratio of dimethylsiloxane to phenylmethylsiloxane units was 9:1 and the copolymer exhibited a viscosity of 30,000 centistokes ($3 \times 10^{-3}$ m$^2$/sec.). The viscosity of the composition containing the copolymer was too high to achieve any improvement in penetration compared to the curable composition without any additive.

Each of the compositions to be evaluated was applied as a 2–3 mm-thick layer to one face of a 0.5 inch (1.25 cm)-thick slab cut from the end of an oak log. The diameters of the pores in the slab were 1 mm or less. The compositions were then exposed to ambient conditions (22° C. and 40% relative humidity) for 16 to 24 hours, during which time the composition cured to an elastomer. The elastomer was then removed from the substrate without tearing away the portions that had penetrated into the pores of the substrate, and the length of these portions were measured to determine the depth to which the composition had penetrated into the pores of the substrate.

The results of these measurements are recorded in the following table.

| Additive | Depth of Penetration (mm.) |
|---|---|
| D1 | 2–5 |
| D2 | 4–6 |
| D3 | 5–7 |
| D4* | 1–2 |
| D5* | 1 |
| None* | 1 |

*Evaluated for comparative purposes

That which is claimed is:

1. An organosiloxane composition comprising

A) a liquid crosslinkable polyorganosiloxane containing at least two reactive groups per molecule;

B) a crosslinking agent selected from the group consisting of an organohydrogensiloxane containing at least two silicon-bonded hydrogen atoms per molecule and an organosilicon compound containing an average of at least three silicon-bonded hydrolyzable groups per molecule, wherein said organohydrogensiloxane contains an average of at least three silicon-bonded hydrogen atoms per molecule when said polyorganosiloxane contains two reactive groups per molecule and, wherein the concentration of said crosslinking agent is sufficient to obtain a crosslinked product when reacted with said polyorganosiloxane;

C) an amount of a catalyst sufficient to promote crosslinking of said composition; and D) a liquid organopolysiloxane oligomer containing an average of at least one phenylalkyl-containing siloxane unit per molecule selected from the group consisting of phenylalkylsiloxanes and (phenylalkyl)alkylsiloxanes, wherein the alkyl radical and the alkyl portion of the phenylalkyl radical contain from 1 to 4 carbon atoms, the concentration of said oligomer is sufficient to increase the penetration of said composition when applied on a porous substrate, and said oligomer exhibits limited compatibility with said polyorganosiloxane.

2. A compositions according to claim 1 wherein at least a portion of the repeating units in said oligomer are represented by the formula $R^1(PhC_pH_{2p})SiO$, wherein Ph represents phenyl and $R^1$ represents an alkyl radical containing from 1 to about 10 carbon atoms, and p is selected from the group consisting of 0 and integers from 1 to 4, inclusive, and said oligomer contains, up to 30 repeating units per molecule.

3. A composition according to claim 2, wherein $R^1$ contains from 1 to 3 carbon atoms, p is 0, 2 or 3 and said oligomer contains no more than 10 repeating units, at least 20 percent of which are represented by said formula.

4. A composition according to claim 3 wherein $R^1$ is methyl and said oligomer is a cyclic organosiloxane.

5. A composition according to claim 1 wherein the repeating units of said liquid crosslinkable polyorganosiloxane (A) exhibit the formula $X_qR^2_rSiO_{4-q-r/2}$, wherein X represents hydroxyl or an ethylenically unsaturated group, $R^2$ represents an unsubstituted or substituted monovalent hydrocarbon radical, q is 0 or 1 and r is 1 or 2.

6. A composition according to claim 5 wherein at least one $R^2$ substituent in each of said units in an alkyl radical containing from 1 to 4 carbon atoms.

7. A composition according to claim 5 wherein X represents an alkenyl radical, said crosslinking agent is an organohydrogensiloxane and said catalyst is selected from the group consisting of metals from the platinum group of the periodic table and compounds of said metals.

8. A composition according to claim 5 wherein X represents a hydroxyl group, said crosslinking agent is an organohydrogensiloxane and said catalyst is selected from the group consisting of metals from the platinum group of the periodic table and compounds of said metals.

9. A composition according to claim 5 wherein X represents a hydroxyl group, said crosslinking agent is an organosilicon compound containing at least three silicon-bonded hydrolyzable groups per molecule and said catalyst is selected from the group consisting of tin compounds and titanium compounds.

* * * * *